United States Patent
Cuddeback

(12) 
(10) Patent No.: US 11,677,913 B2
(45) Date of Patent: Jun. 13, 2023

(54) TRAIL CAMERA

(71) Applicant: Non Typical, Inc., De Pere, WI (US)

(72) Inventor: Mark J. Cuddeback, Green Bay, WI (US)

(73) Assignee: Non Typical, Inc., De Pere, WI (US)

( * ) Notice: Subject to any disclaimer, the term of this patent is extended or adjusted under 35 U.S.C. 154(b) by 0 days.

(21) Appl. No.: 17/682,679

(22) Filed: Feb. 28, 2022

(65) Prior Publication Data

US 2022/0321847 A1 Oct. 6, 2022

Related U.S. Application Data

(63) Continuation of application No. 16/952,463, filed on Nov. 19, 2020, now Pat. No. 11,265,519.

(60) Provisional application No. 62/937,495, filed on Nov. 19, 2019.

(51) Int. Cl.
  *H04N 7/18* (2006.01)
  *H04N 23/667* (2023.01)
  *H04B 1/02* (2006.01)

(52) U.S. Cl.
  CPC ............ *H04N 7/188* (2013.01); *H04N 7/183* (2013.01); *H04N 23/667* (2023.01); *H04B 1/02* (2013.01)

(58) Field of Classification Search
  CPC ...... H04N 7/11; H04N 5/23245; H04N 7/183; H04B 1/02
  USPC ........................................................ 348/143
  See application file for complete search history.

(56) References Cited

U.S. PATENT DOCUMENTS

| | | | |
|---|---|---|---|
| 8,810,718 | B1 | 8/2014 | Cuddeback |
| 8,891,001 | B2 | 11/2014 | Cuddeback et al. |
| 9,001,265 | B2 | 4/2015 | Momose |
| 9,282,298 | B2 | 3/2016 | Cuddeback et al. |
| 9,871,959 | B1* | 1/2018 | Hlatky ............... H04N 5/23216 |
| 10,499,015 | B2 | 12/2019 | Cuddeback et al. |
| 2007/0124068 | A1* | 5/2007 | Nakayama ......... G01C 21/3655 |
| | | | 701/414 |
| 2013/0018529 | A1* | 1/2013 | Ploschnitznig .... H04B 7/18517 |
| | | | 701/2 |
| 2015/0242969 | A1* | 8/2015 | Pallas .................... B67D 7/145 |
| | | | 705/39 |
| 2016/0174339 | A1* | 6/2016 | Rajagopalan ........ H05B 47/115 |
| | | | 315/152 |

* cited by examiner

*Primary Examiner* — Jared Walker
(74) *Attorney, Agent, or Firm* — Michael Best & Friedrich LLP

(57) ABSTRACT

A system and method of operating a trail camera assembly. A trail camera assembly comprises a camera casing, a camera configured to take a picture, and a controller connected to the motion sensor and the camera. The controller is configured to operate the trail camera assembly in a first operating mode. The controller is configured to determine whether a time threshold is satisfied, the time threshold being a time of day. The controller is configured to compare, in response to the time threshold being satisfied, ambient light detected by the trail camera assembly to an ambient light threshold, and transition, in response to the ambient light satisfying the ambient light threshold, to a second operating mode. When in the second operating mode, the controller takes a picture at set time intervals.

20 Claims, 4 Drawing Sheets

TRAIL CAMERA

RELATED APPLICATIONS

This application is a continuation of U.S. patent application Ser. No. 16/952,463, filed Nov. 19, 2020, which issued as U.S. Pat. No. 11,265,519 on Mar. 1, 2022, which claims priority to U.S. Provisional Patent Application No. 62/937,495, filed Nov. 19, 2019, the entire content all of which is hereby incorporated by reference.

TECHNICAL FIELD

This application relates to a trail camera and, more specifically, to adjusting operating parameters of a trail camera.

SUMMARY

Hunters and biologists often utilize trail cameras to obtain pictures of wildlife. The trail camera may be set up with preconfigured settings to determine how pictures are taken. For example, the trail camera may be placed in a "time lapse mode" that takes a picture after a certain amount of time has passed (a "time interval"), such as taking a picture once every 5 minutes. However, animals are not active at all times of the day, and there may be extended periods of time where pictures are taken with no animals present. This fills the camera memory with undesirable images and requires the user to delete empty pictures.

To alleviate this problem, trail cameras are often equipped with a motion sensor (e.g., an infrared motion (IR) sensor) that will trigger when an animal is in front of the camera, often referred to as a "motion-detection mode." Such cameras are often placed in the motion-detection mode by default. When an animal is detected by the camera (often called a "trigger"), the camera is programmed to take a picture. Once the picture is taken, the camera resets and waits to take another picture when the sensor detects the presence of an animal. If desired, the camera can be programmed to wait a predetermined amount of time (e.g., a time delay setting) before allowing another picture to be taken. This time delay setting is the minimum amount of time allowed between pictures. If an animal remains in front of the camera, the camera continues to take numerous pictures of the same animal at a frequency of the time delay setting. This fills the camera memory with images of the same animal and requires the user to delete duplicative pictures. For this reason, it may be desirable to be able to detect when an animal remains in front of a camera for an extended period of time and change (e.g., increase) the time delay setting to reduce the number of pictures taken.

There are often certain times of the day when wildlife is more active (i.e., a "prime time"). During these times, it is often desirable to place the camera in time lapse mode so that pictures are reliably taken at regular intervals (e.g., time interval) when animals may be out of range of the motion sensor. For example, wildlife may be active most during the hours around sunrise and sunset. The camera detects these changes in lighting indicating sunrise or sunset (or is programmed to know the sunrise and sunset times throughout the year for that geographic location) and switches from motion-detection mode to time lapse mode (aka "prime time mode"). Sunrise and sunset may also be determined based on times of darkness from a previous day. For example, the detected changes in lighting indicating sunrise or sunset from a previous day are stored and used for the following day(s). The camera remains in time lapse mode for a period of time indicated by the prime time setting. The user can also establish a prime time setting where the camera enters the time lapse mode for only a given time period, as indicated by a clock.

In one embodiment, the invention provides a trail camera assembly including a camera casing, a motion sensor configured to provide a motion signal associated with a detected presence of an animal, and a camera configured to take a picture. The trail camera assembly also includes a controller connected to the motion sensor and the camera, the controller including an electronic processor and a memory and configured to operate in a first operating mode and a second operating mode. When in the first operating mode, the controller takes a picture using the camera in response to the motion signal received from the motion sensor. The controller enters the second operating mode in response to a time threshold being reached. When in the second operating mode, the controller takes a picture using the camera in response to a time interval being satisfied.

Another embodiment provides a trail camera assembly including a camera casing, a motion sensor configured to provide a motion signal associated with a detected presence of an animal, and a camera configured to take a picture. The trail camera assembly further includes a controller connected to the motion sensor and the camera, the controller including an electronic processor and memory. The controller is configured to operate in a first motion-detecting mode in which the controller takes the picture using the camera in response to the motion signal received from the motion sensor, upon taking the picture, add to a trigger counter, compare the trigger counter to a first threshold, and, in response to the trigger counter being equal to or exceeding the first threshold, operate in a second motion-detecting mode in which the controller takes the picture using the camera in response to a time delay being satisfied and in response to the motion signal received from the motion sensor.

Another embodiment provides a method of operating a trail camera. The method includes operating the trail camera in a first operating mode in which the trail camera takes a picture in response to a motion signal received from a motion sensor, determining whether a threshold has been satisfied, and, in response to determining the threshold has been satisfied, operating the trail camera in a second operating mode in which the trail camera takes a picture in response to a time interval being satisfied. The threshold includes at least one of a group consisting of a length of time, a time of day, and an amount of light.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "controllers" and "electronic processors" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Figure 1:
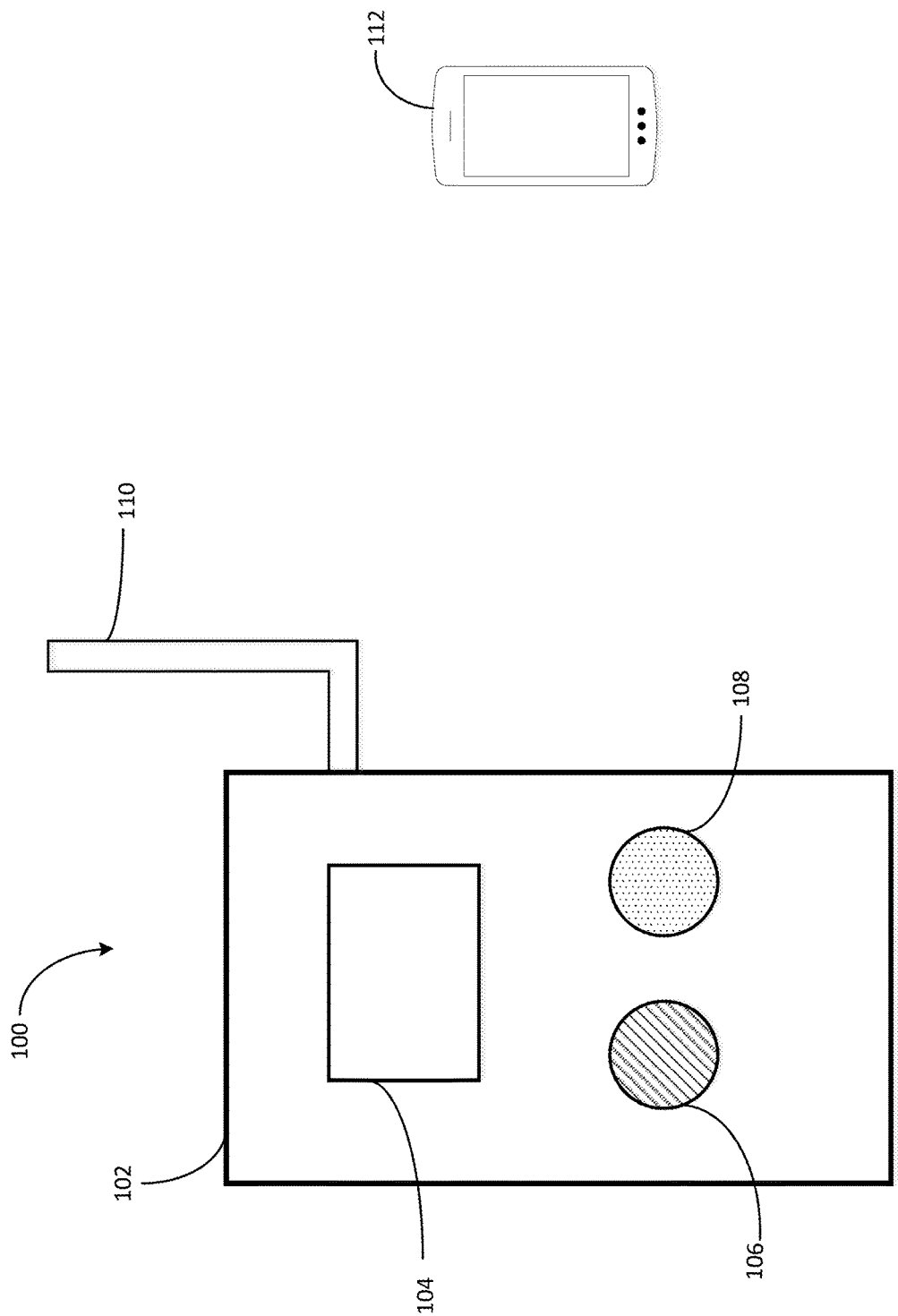
FIG. 1 illustrates a trail camera according to one embodiment.
Figure 2:
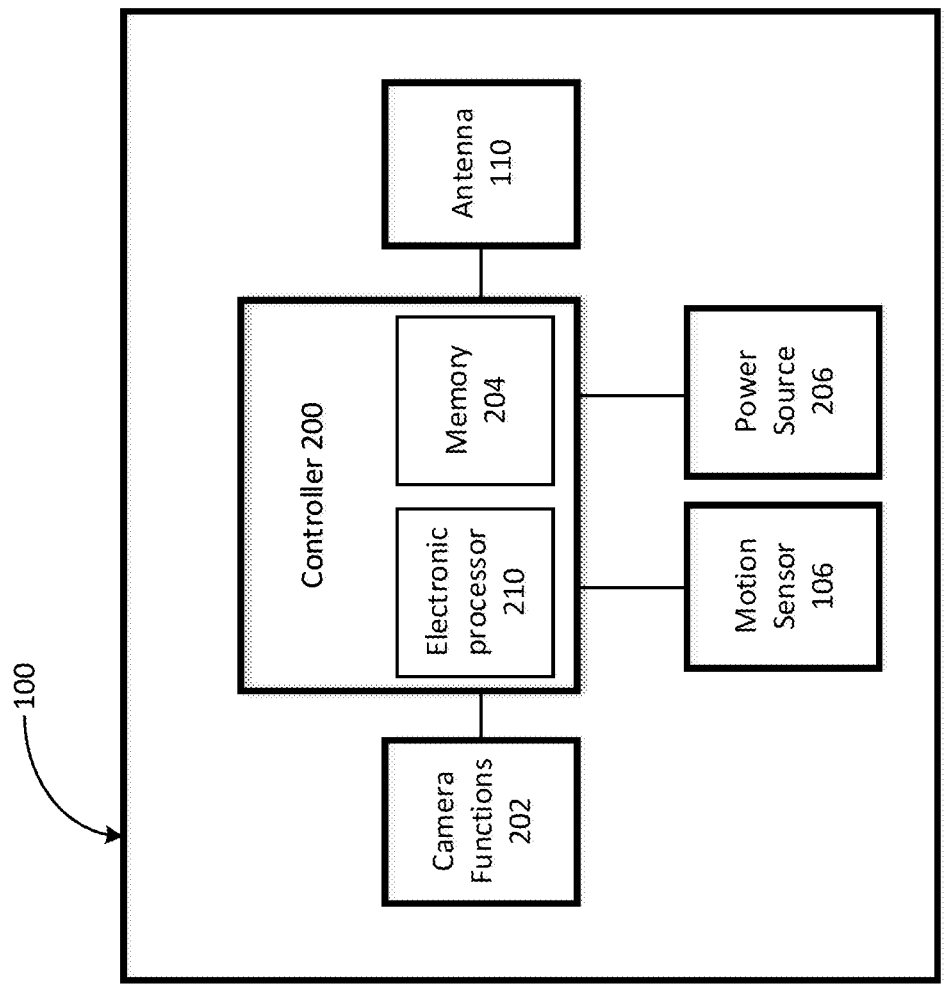
FIG. 2 illustrates a block diagram of components of the trail camera of FIG. 1.

FIGS. 1 and 2 illustrate a trail camera assembly 100 including a camera casing 102 (e.g., a camera housing), a camera flash 104, a motion sensor 106, a camera 108, an antenna 110, a wireless device 112, and a controller 200. The camera casing 102 contains the camera flash 104, the motion sensor 106, the camera 108, and the controller 200. The camera flash 104, the motion sensor 106, the camera 108, and the antenna 110 are connected via the controller 200. The wireless device 112 is wirelessly connected to the trail camera assembly 100 via the antenna 110.

The motion sensor 106 is designed to sense motion of the object to be detected (e.g., an animal). In the illustrated embodiment, the motion sensor 106 is an infrared sensor. In other embodiments, the motion sensor 106 could comprise other sensors that indicate movement of an animal, such as a laser beam with photocell or an acoustic sensor. The motion sensor 106 could further include a light sensor. The light sensor detects light of the surrounding area. The light sensor may be implemented using a phototransistor, a photodiode, a photonic integrated circuit, or the like.

FIG. 2 illustrates the controller 200 in more detail. The controller 200 is electrically and/or communicatively connected to a variety of modules or components of the trail camera assembly 100. For example, the illustrated controller 200 is connected to one or more camera functions 202 (e.g., the camera flash 104 and camera 108), the motion sensor 106, the antenna 110, and a power source 206. The illustrated controller 200 includes a memory 204, but the memory 204 could instead be outside the controller 200. The controller 200 includes combinations of hardware and software that are operable to, among other things, capture and store images using the camera functions 202, retrieve pictures and instructions from the memory 204, and communicate wirelessly via the antenna 110. In some embodiments, the controller 200 includes a plurality of electrical and electronic components that provide power, operational control, and protection to the components and modules within the controller 200 and the trail camera assembly 100. For example, the controller 200 includes, among other things, an electronic processor 210. The electronic processor 210, as well as the various modules connected to the controller 200, are connected by one or more control and/or data buses. In some embodiments, the controller 200 is a microcontroller, implemented partially or entirely on a semiconductor (e.g., a field-programmable gate array ["FPGA"] semiconductor) chip, is an application specific integrated circuit ("ASIC"), or some other suitable electronic device.

The memory 204 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, a USB drive, or other suitable magnetic, optical, physical, or electronic memory devices. The electronic processor 210 is connected to the memory 204 and executes software instructions that are capable of being stored in a RAM of the memory 204 (e.g., during execution, a ROM of the memory 204 (e.g., on a generally permanent basis), or another non-transitory computer readable medium such as another memory or a disc. Software included in the implementation of the trail camera assembly 100 can be stored in the memory 204 of the controller 200. The software includes, for example, firmware, one or more applications, program data, filters, rules, one or more program modules, and other executable instructions. The controller 200 is configured to retrieve from memory 204 and execute, among other things, instructions related to the control processes, methods, and communication protocols described herein. In other constructions, the controller 200 includes additional, fewer, or different components. The wireless device 112 may allow the user to view pictures stored in the memory 204.

The power source 206 supplies a nominal DC voltage to the controller 200 or other components or modules of the trail camera assembly 100. The power source 206 is also configured to supply lower voltages to operate circuits and components within the controller 200 or trail camera assembly 100. In some embodiments, the controller 200 or other components are powered by one or more batteries (e.g., 4 AA batteries), battery packs, or other portable or grid-independent power source (e.g., a solar panel, etc.).

In the embodiment illustrated in FIG. 2, the antenna 110 allows the controller 200 to wirelessly communicate with a wireless device 112, such as a cellular device or smart phone. The antenna 110 may communicate using a long-range wireless transmitter and/or transceiver that has a transmitter transmit range on the order of miles, such as a Long Term Evolution (LTE), LTE-Advance, or 5G protocol. The antenna 110 may also use a short-range transmitter, such as a Bluetooth, Zigbee, or NFC.

The antenna 110 may wirelessly communicate with the wireless device 112 (e.g., a device external to the trail camera assembly 100) to accept a user input (for example, a keypad, a touch-sensitive surface, a button, a microphone, etc.). In some embodiments, the user inputs may be determined through a user interface on the trail camera assembly 100. The user input may also, for example, allow a user to change the mode operation of the trail camera assembly 100, such as alternating between motion-detecting mode and time lapse mode. In some embodiments, pictures taken by the trail camera assembly 100 are transmitted to the wireless device 112 via the antenna 110. Pictures may be transmitted at a set time interval or upon request.

As previously discussed, the trail camera assembly 100 may have two primary modes of operating: a motion-detection mode and a time lapse mode. While in the motion-detection mode, the controller 200 takes a picture based on a motion signal received from the motion sensor 106. The motion-detection mode may also include a time delay, or time delay setting, that defines a period of time the controller 200 waits between pictures, as described in more detail below. In the time lapse mode, the controller 200 takes a picture after a set period of time (e.g., at a set frequency). For example, the controller 200 may take a picture once every ten minutes. The controller 200 may switch between the operating modes based on a given condition of the trail camera assembly 100.

Figure 3:
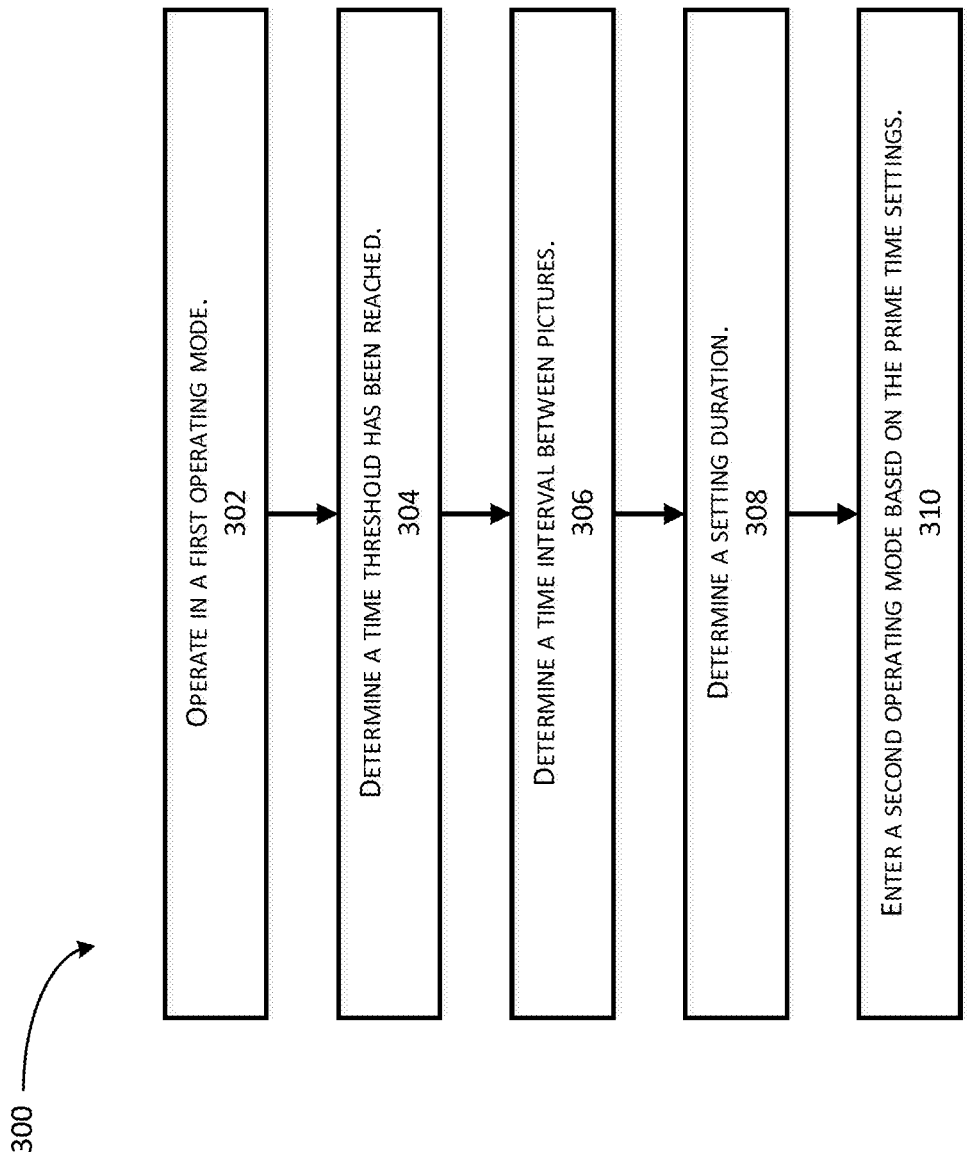
FIG. 3 illustrates a flow chart of a method of entering a prime time mode of the trail camera of FIG. 1.

FIG. 3 illustrates a flow chart diagram of a method 300 performed by the controller 200 for entering a prime time setting. In this method 300, the trail camera assembly 100 starts in a motion-detection mode that takes a picture whenever the motion sensor 106 is triggered. In the method 300 of FIG. 3, the processor will switch the trail camera assembly 100 to a time lapse mode for only certain times of the day when animals are typically most active. While a particular order of processing steps is indicated in FIG. 3 as an example, the timing and order of such steps may vary where appropriate without negating the purpose and advantages of the examples set forth in detail through the remainder of this disclosure. While FIG. 3 illustrates a method 300 with several blocks, the method 300 could be conducted with more or less steps where appropriate.

As noted above, at block 302, the controller 200 operates the trail camera assembly 100 in a first operating mode (e.g., the motion-detection mode). At block 304, the controller 200 determines whether a time threshold has been reached. This time threshold indicates when the trail camera assembly 100 is to be switched to time lapse mode. In an alternative embodiment, the trail camera assembly 100 starts in a sleep mode (e.g., an IDLE mode, an OFF mode) in which picture taking is stopped. At block 304, the controller 200 determines whether a time threshold has been reached. This time threshold indicates that the trail camera assembly 100 should wake-up and enter time lapse mode. In the preferred embodiment, the processor switches the trail camera assembly 100 to time lapse mode when sunrise or sunset begins. For example, the light sensor of the motion sensor 106 detects a change in ambient light indicating a time of day. The required ambient lighting may be determined based on data stored in memory 204. Data indicating evening darkness calculated from the previous day may indicate a trend for the trail camera assembly 100 to follow. For example, the trail camera assembly 100 may determine a certain time at which sunset regularly occurs. The trail camera assembly 100 can then check the ambient lighting only around this time in order to save power. A user may also set the prime time setting to control the trail camera assembly 100 to enter time lapse mode at a specific time each day. For example, if the user has chosen the prime time setting to instruct the trail camera assembly 100 to enter time lapse mode at 6 PM, the controller 200 checks the time and compares the time to the stored time threshold. This may be determined using a clock within the controller 200 or via the antenna 110 communicating with a satellite. If the controller 200 determines the time threshold has been met, the controller 200 moves to block 306. If the controller 200 determines the threshold has not been met, the controller 200 waits for a predetermined amount of time before checking again. At block 306, the controller 200 determines a time interval between pictures as set by the user. For example, the user may have set, using the prime time settings, the time interval to be 5 minutes between each picture. Once a picture is taken, the trail camera assembly 100 would wait 5 minutes before taking another picture, and continues this while the trail camera assembly 100 remains in time lapse mode.

At block 308, the controller 200 determines a setting duration set by the user. For example, the setting duration for the prime time setting may be 3 hours. Once the time threshold has passed and the trail camera assembly 100 is placed in time lapse mode, it remains in time lapse mode for 3 hours. The trail camera assembly 100 then returns to the default mode, as set by the user. In some embodiments, the setting duration is adjusted based on a signal received from the wireless device 112. For example, a user of the wireless device 112 sets the setting duration at a length of 6 hours. At block 310, the controller 200 enters operates in a second operating mode (e.g., the time lapse mode) based on the prime time settings.

Figure 4:
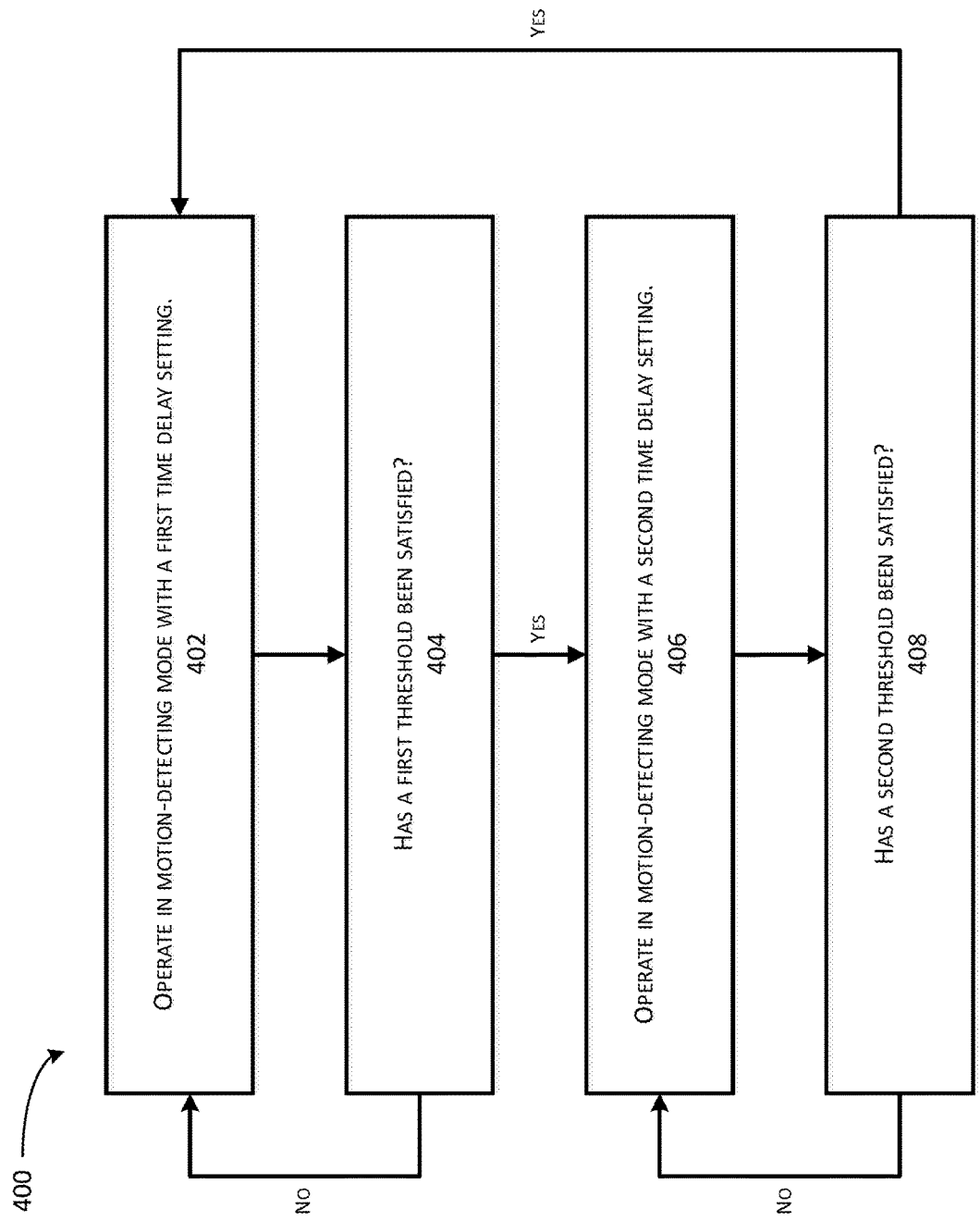
FIG. 4 illustrates a flow chart of a method of changing a camera delay setting of the trail camera of FIG. 1.

FIG. 4 illustrates a flow chart diagram of a method 400 performed by the controller 200 for updating the time delay setting of the trail camera assembly 100 in a motion-detection mode. The time delay setting of motion-detection mode determines the minimum amount of time between two pictures. While a particular order of processing steps is indicated in FIG. 4 as an example, timing and order of such steps may vary where appropriate without negating the purpose and advantages of the examples set forth in detail through the remainder of this disclosure. While FIG. 4 illustrates a method 400 with several blocks, the method 400 could be conducted with more or less steps where appropriate.

At block 402, the trail camera assembly 100 operates in motion-detecting mode with a first time delay setting. This time delay setting may be, for example, a minimum of 5 seconds between pictures. Upon receiving a trigger signal from the motion sensor 106 indicating motion, the trail camera assembly 100 checks to see if at least a time period corresponding with the first time delay has passed since the last picture was taken. If yes, then the trail camera assembly 100 takes a picture. If no, then the trail camera assembly 100 does not take a picture. Although the motion sensor 106 may continuously signal the presence of motion, such as if an animal is standing in front of the trail camera assembly 100, the controller 200 will not take a picture if the trail camera assembly 100 is in the delay time period. After receiving the trigger signal from the motion sensor 106, the controller 200 continues to block 404.

At block 404, the controller 200 determines if a first trigger threshold has been reached. The trigger threshold is the number of trigger signals in a given time period. The trigger threshold may be, for example, 5 trigger signals detected within 10 seconds. In one embodiment, the threshold is compared using a clock and a counter connected to the controller 200. Following each trigger signal from the motion sensor 106, the controller 200 checks if the first trigger threshold has been reached, regardless of whether or not a picture is taken.

The controller 200 stores in the memory 204 the number of trigger signals over the time period determined by the first trigger threshold. For example, when the trigger threshold is 5 trigger signals detected within 10 seconds, the controller 200 stores the number of motion triggers that have occurred over those 10 seconds. If only 4 trigger signals occur over the 10 second time period, the threshold is not satisfied. This comparison happens continuously.

If the first trigger threshold has not been reached, the controller 200 adds to the counter, returns to block 402, and waits the duration of the first time delay setting before allowing another picture to be taken. Once the time delay setting duration has been reached, the controller 200 allows pictures to be taken again.

If the first trigger threshold has been reached, the controller 200 continues to block 406. At block 406, the controller 200 switches the trail camera assembly 100 to a second time delay setting and also implements a second trigger threshold. In this second time delay setting, the minimum time delay between pictures is increased to, for example, 1 minute. Upon receiving a trigger signal from the motion sensor 106 indicating motion, the trail camera assembly 100 checks to see if at least a time period corresponding with the second time delay has passed since the last picture was taken. If yes, then the trail camera assembly 100 takes a picture. If no, then the trail camera assembly 100 does not take a picture. After receiving the trigger signal from the motion sensor 106, the controller 200 continues to block 408.

At block 408, the controller 200 determines if the number of trigger signal from the motion sensor 106 falls below the second trigger threshold. The second trigger threshold is also based on frequency, and is preferably a frequency lower than the first picture threshold. The threshold may be, for example, 2 pictures within 10 minutes. This threshold may also be compared to the clock and counter connected to the controller 200. The controller 200 is periodically checking the number of trigger signals received during the second threshold time period (e.g., 10 minutes), such that the controller 200 can determine if the frequency of pictures falls below the threshold.

If the second picture threshold has been satisfied (e.g., the number of trigger signals from the motion sensor 106 is less than the second picture threshold), the controller returns to block 402. While in the second time delay setting, if the motion sensor 106 fails to detect an animal for a period of time as defined by the second picture threshold, the controller 200 returns to the first time delay setting or changes to another time delay setting that is less than the second time delay setting. The method 400 may be extended for any number of thresholds as appropriate.

Thus, embodiments described herein provide, among other things, systems, methods, and devices for controlling the settings of a trail camera. Various features and advantages are set forth in the following claims.

What is claimed is:

1. A trail camera assembly comprising:
   a camera casing;
   a camera configured to take a picture; and
   a controller connected to the camera, the controller configured to:
   operate the trail camera assembly in a first operating mode,
   determine whether a time threshold is satisfied, wherein the time threshold is a time of day,
   compare, in response to the time threshold being satisfied, ambient light detected by the trail camera assembly to an ambient light threshold, and
   transition, in response to the ambient light satisfying the ambient light threshold, to a second operating mode,
   wherein, when in the second operating mode, the controller takes a picture at set time intervals.

2. The trail camera assembly of claim 1, further comprising a motion sensor configured to provide a motion signal associated with a detected presence of an animal, and wherein, when in the first operating mode, the controller takes a picture using the camera in response to the motion signal received from the motion sensor.

3. The trail camera assembly of claim 1, wherein the first operating mode is a sleep mode.

4. The trail camera assembly of claim 1, further comprising an antenna, and wherein the controller is configured to receive the time of day from a satellite.

5. The trail camera assembly of claim 1, wherein the time threshold is based on a user setting.

6. The trail camera assembly of claim 5, wherein the user setting is received from an external device communicatively coupled to the trail camera assembly.

7. The trail camera assembly of claim 1, wherein the controller is further configured to:
   receive a setting duration set by a user, and
   transition, in response to the setting duration being satisfied, from the second operating mode to the first operating mode.

8. The trail camera assembly of claim 7, wherein the setting duration is received from an external device communicatively coupled to the trail camera assembly.

9. The trail camera assembly of claim 1, wherein the controller is further configured to:
   monitor, in response to the ambient light not satisfying the ambient light threshold, the ambient light.

10. The trail camera assembly of claim 1, further comprising a light sensor configured to detect ambient light, and wherein the controller is configured to receive light signals from the light sensor indicative of the detected ambient light.

11. A method for operating a trail camera assembly, the method comprising:
   operating, with a controller, the trail camera assembly in a first operating mode,
   determining, with the controller, whether a time threshold is satisfied, wherein the time threshold is a time of day,
   comparing, with the controller and in response to the time threshold being satisfied, ambient light detected by the trail camera assembly to an ambient light threshold, and
   transitioning, with the controller and in response to the ambient light satisfying an ambient light threshold, to a second operating mode,
   wherein, when in the second operating mode, the controller takes a picture at set time intervals.

12. The method of claim 11, further comprising:
   receiving, with the controller, a motion signal from a motion sensor,
   wherein, when in the first operating mode, the controller takes a picture in response to the motion signal received from the motion sensor.

13. The method of claim 11, wherein the first operating mode is a sleep mode.

14. The method of claim 11, further comprising receiving, with an antenna, the time of day from a satellite.

15. The method of claim 11, further comprising receiving, with the controller, a user setting, wherein the time threshold is based on the user setting.

16. The method of claim 15, wherein the user setting is received from an external device communicatively coupled to the trail camera assembly.

17. The method of claim 15, further comprising:
receiving, with the controller, a setting duration set by a user, and
transitioning, with the controller and in response to the setting duration being satisfied, from the second operating mode to the first operating mode.

18. The method of claim 17, wherein the setting duration is received from an external device communicatively coupled to the trail camera assembly.

19. The method of claim 11, further comprising monitoring, in response to the ambient light not satisfying the ambient light threshold, the ambient light.

20. The method of claim 11, further comprising receiving, with the controller, light signals from a light sensor indicative of detected ambient light.

\* \* \* \* \*